United States Patent
Chang et al.

(10) Patent No.: US 9,001,509 B2
(45) Date of Patent: Apr. 7, 2015

(54) EXPANSION DEVICE

(75) Inventors: Ching-Sung Chang, New Taipei (TW);
Ju-Nan Chang, New Taipei (TW);
Shih-Chin Tseng, New Taipei (TW);
Chen-Chen Liu, New Taipei (TW); Qi Liu, Shanghai (CN)

(73) Assignees: Inventec Appliances (Pudong) Corporation, Shanghai (CN); Inventec Appliances Corp., New Taipei (TW)

( * ) Notice: Subject to any disclaimer, the term of this patent is extended or adjusted under 35 U.S.C. 154(b) by 121 days.

(21) Appl. No.: 13/602,317

(22) Filed: Sep. 3, 2012

(65) Prior Publication Data
US 2013/0058026 A1  Mar. 7, 2013

(30) Foreign Application Priority Data
Sep. 5, 2011  (CN) .......................... 2011 1 0260246

(51) Int. Cl.
*G06F 1/16*  (2006.01)

(52) U.S. Cl.
CPC ................... *G06F 1/1632* (2013.01)

(58) Field of Classification Search
CPC ... G06F 1/1626; G06F 1/1632; G06F 3/0231; G06F 2200/1633; G06F 2200/1634
See application file for complete search history.

(56) References Cited

U.S. PATENT DOCUMENTS

| | | | |
|---|---|---|---|
| 8,467,183 B2 * | 6/2013 | Probst et al. | 361/679.55 |
| 2005/0057894 A1 * | 3/2005 | Kim et al. | 361/683 |
| 2005/0168925 A1 * | 8/2005 | Fang et al. | 361/683 |
| 2011/0149497 A1 * | 6/2011 | Ma et al. | 361/679.27 |
| 2011/0267757 A1 * | 11/2011 | Probst et al. | 361/679.09 |
| 2012/0099263 A1 * | 4/2012 | Lin | 361/679.09 |
| 2012/0162951 A1 * | 6/2012 | Hamada | 361/807 |
| 2013/0163187 A1 * | 6/2013 | Wang et al. | 361/679.41 |

* cited by examiner

*Primary Examiner* — David M Sinclair
*Assistant Examiner* — Robert Brown
(74) *Attorney, Agent, or Firm* — Novak Druce Connolly Bove + Quigg LLP

(57) ABSTRACT

An expansion device is disclosed which includes an input/output body, a connection part, a turning structure, and at least one slot. The input/output body at least includes a first and a second input/output module, where the first and the second input/output modules are respectively disposed on two opposite surfaces of the input/output body. The connection part is disposed on one side of the input/output body. The turning structure is disposed to connect the input/output body and the connection part, wherein the connection part and the input/output body are turnable on the turning structure. The at least one slot is disposed on the connection part and configured to hold at least one mobile device.

11 Claims, 10 Drawing Sheets

EXPANSION DEVICE

CROSS-REFERENCE TO RELATED APPLICATION

This application claims the priority benefit of China application serial no. 201110260246.9, filed on Sep. 5, 2011. The entirety of the above-mentioned patent application is hereby incorporated by reference herein and made a part of this specification.

BACKGROUND OF THE INVENTION

1. Field of the Invention

The invention relates to an expansion device, and, in particular, relates to an expansion device applicable to a mobile device.

2. Description of Related Art

In recent years, mobile devices such as cell phones, handheld game consoles, tablet devices or notebooks have become popular electronic devices due to research, development, and promotion by technology industries in the United States, Europe, Japan and Korea. With the progress of technologies, mobile devices have also become parts in people's life. However, it is well-known that no matter how great the touch-control functions of a mobile device such as a tablet device are, or how sensitive the virtual buttons (keyboard) are, some people are still more accustomed to inputting texts or giving instructions for operating a tablet device via physical keyboards. In particular, when a button of the physical keyboard is pressed, the springiness of the button relieves the pressure of fingers, which is more comfortable than using fingers to touch the hard glass-surface of the tablet devices.

Accordingly, a lot of removable keyboards have appeared in the market. The removable keyboards may optionally be assembled with tablet devices, such that users can easily type on the physical keyboards when they need to input texts or give instructions of operating. On the other hand, when the users don't need keyboards, the removable keyboards can be removed from the tablet devices to make the tablet devices become light, thin and easy to be carried again.

However, current removable keyboards simply provide an advantage that they can be easily assembled with the mobile device, while providing less additional capabilities or functionalities. Compared with functionalities such as document processing and enjoyment of visual effects provided by tablet devices, removable keyboards cannot effectively assist in providing miscellaneous functions of mobile devices, such that the demands of people for e.g. enjoyment of visual effects cannot be satisfied. In addition, removable keyboards cannot provide functionalities of screen protection to mobile devices as well.

SUMMARY OF THE INVENTION

In view of problems in the prior art, an objective of the present invention is to provide an expansion device suitable for expanding capabilities of a mobile device, to enable nearly full use of the mobile device with more capabilities.

According to an objective of the present invention, the invention provides an expansion device suitable for expanding capabilities of a mobile device. The expansion device includes an input/output body, a connection part, a turning structure and at least one slot. The input/output body has a first input/output module and a second input/output module disposed respectively on two opposite surfaces of the input/output body. The connection part is disposed on one side of the input/output body. The turning structure is disposed to connect the input/output body and the connection part, wherein the connection part and the input/output body are turnable on the turning structure. The at least one slot is disposed on the connection part and configured to hold at least one mobile device.

When the expansion device provided by the invention is assembled with a mobile device, the expansion device can provide a working mode (e.g., performing input via using a keyboard or a touch panel) and an entertainment mode (e.g., enjoying music while watching the mobile device, or using a projector to project images). On the other hand, when the mobile device is not in use, the screen of the mobile device can be protected by superposing the mobile device over the input/output body, and hence the mobile device can be easily carried.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
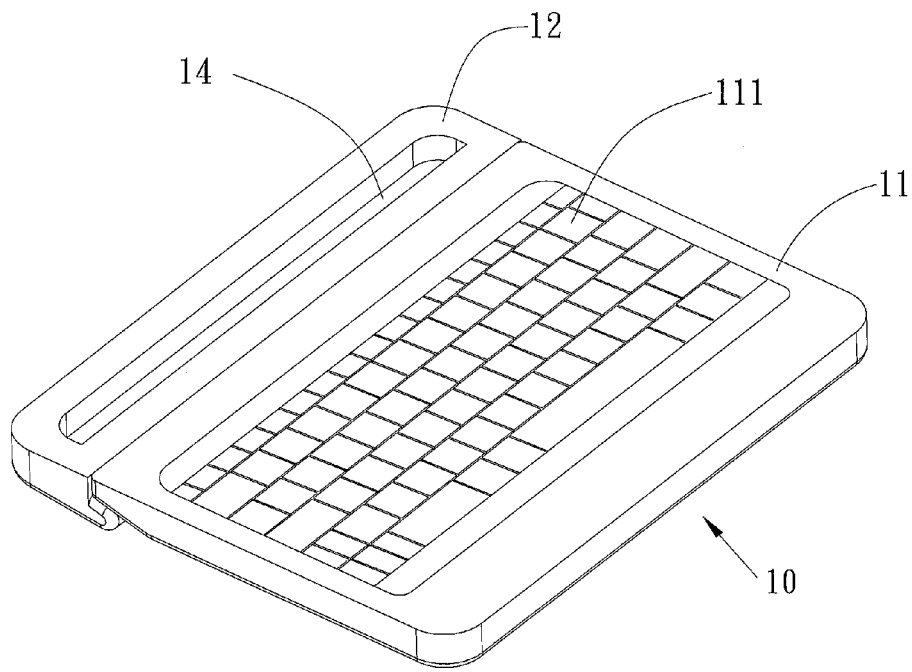
FIG. 1A is a 3-D schematic diagram of an expansion device being in a working mode according to a first embodiment of the invention.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

Figure 1B:
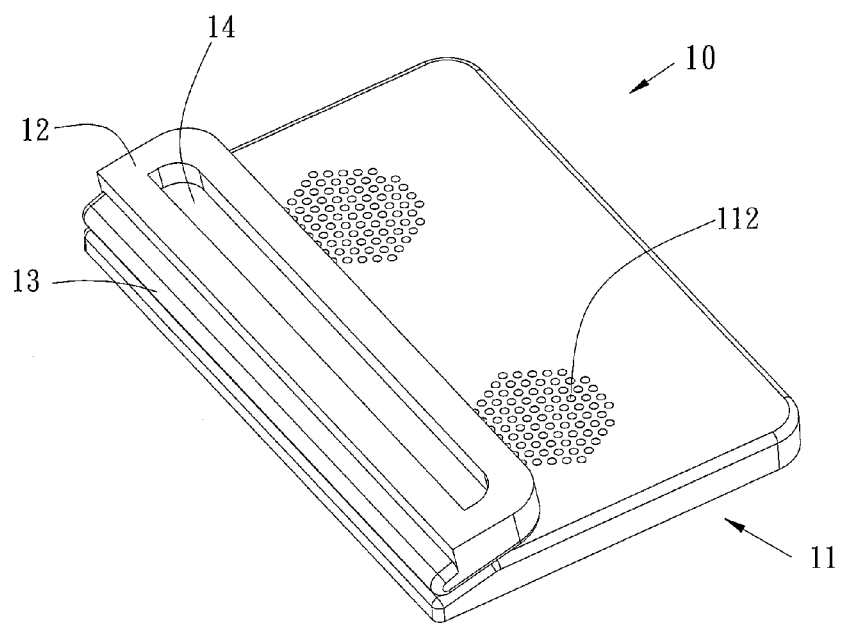
FIG. 1B is another 3-D schematic diagram of the expansion device illustrated in FIG. 1A according to the first embodiment of the invention.

FIG. 1A is a 3-D schematic diagram of an expansion device 10 being in a working mode according to a first embodiment of the invention. FIG. 1B is another 3-D schematic diagram of the expansion device 10 illustrated in FIG. 1A according to the first embodiment of the invention. Referring to both FIGS. 1A and 1B, the expansion device 10 includes an input/output body 11, a connection part 12, a turning structure 13 and a slot 14. The input/output body 11 and the connection part 12 are connected through the turning structure 13 and turnable on the turning structure 13. It should be noted that the turning structure 13 can be any kind of structure that can connect the input/output body 11 with the connection part 12 to construct an assembly. Accordingly, the turning structure 13 may be, for example, a hinge, a bearing, a slide rail, a butterfly buckle, a flexible component (e.g., a flexible tube) or a magnetic connector, etc.

In this embodiment, the input/output body 11 has a first input/output module (e.g., a keyboard 111) and a second input/output module (e.g., a speaker device 112). The keyboard 111 and the speaker device 112 are respectively disposed on two opposite surfaces of the input/output body 11. It should be noted that the keyboard 111 and the speaker device 112 are used as examples in the embodiment instead of being used to limit the scope of the present invention. Other devices such as a touch panel or a projector can also be the first input/output module or the second input/output module, which is not limited thereto. In this embodiment, the number of the slot 14 is one.

The turning structure 13 is disposed to connect the input/output body 11 and the connection part 12, wherein the connection part 12 and the input/output body 11 are turnable on the turning structure 13. Compared with FIG. 1A, the connection part 12 in FIG. 1B can be regarded as turning the connection part 12 in FIG. 1A by nearly 180 degrees. In addition, the input/output body 11 and the connection part 12 may be materials of plastic injection molding, magnesium aluminium alloy or other materials, which is not limited thereto.

Figure 2:
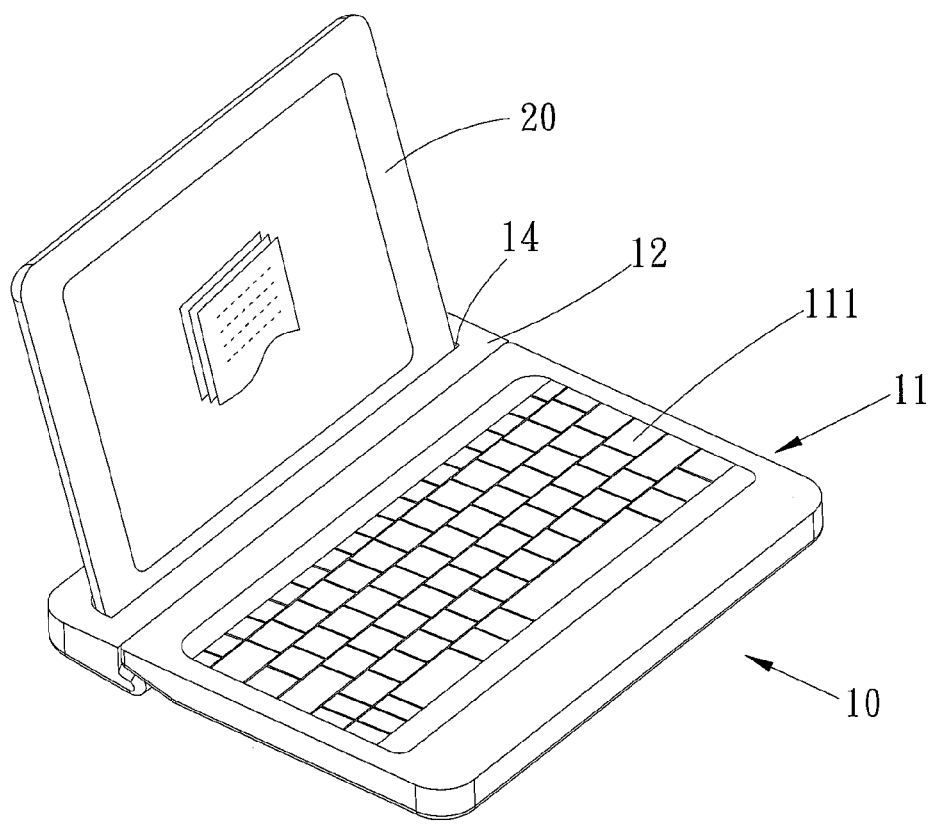
FIG. 2 is a schematic diagram illustrating that the expansion device, which is assembled with a mobile device, operates in the working mode according to the first embodiment of the invention.
Figure 3:
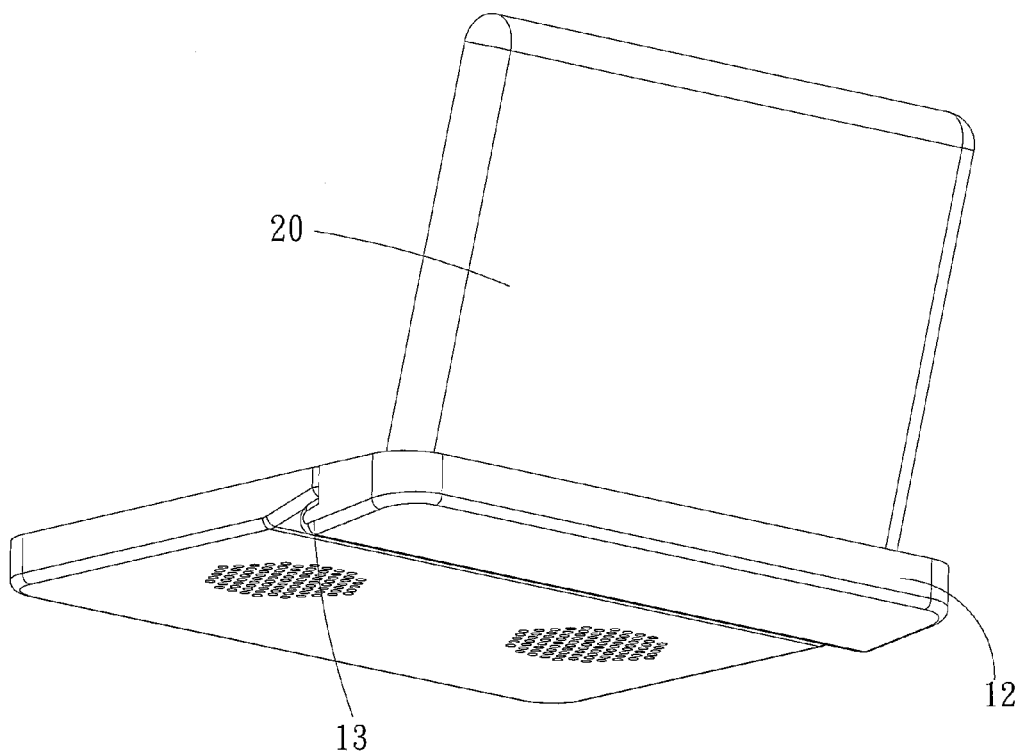
FIG. 3 is a schematic diagram illustrating another point of view of the expansion device, which is assembled with a mobile device, operates in the working mode according to the first embodiment of the invention.

FIG. 2 is a schematic diagram illustrating that the expansion device, which is assembled with a mobile device, operates in the working mode according to the first embodiment of the invention. FIG. 3 is a schematic diagram illustrating another point of view of the expansion device, which is assembled with a mobile device, operates in the working mode according to the first embodiment of the invention. In these embodiments, the expansion device 10 is holding a mobile device 20. The mobile device 20 may be, for example, a tablet device, a cell phone, an e-book, a personal digital assistant (PDA) or a mobile Internet device, which is not limited thereto. The frame at the bottom of the mobile device 20 is held in the slot 14. The mobile device 20 may be electrically connected with the expansion device 10, and the way of the connection may be implemented with wired or wireless connection.

The wired connection between the mobile device 20 and the expansion device 10 may be implemented by disposing at least one port in the mobile device 20, in which the at least one port may be connected with at least one terminal of the slot 14. The connection part 12 may be further connected with the input/output body 11 by wire or wirelessly (e.g., via a wireless transmission module).

The wireless connection between the mobile device 20 and the expansion device 10 may be implemented by using a built-in wireless transmission module of the mobile device 20 and a corresponding wireless transmission module of the input/output body 11 (or the connection part 12) of the expansion device 10 to achieve the purpose of wireless connection. Therefore, it is needless to install any terminal on the expansion device 10. The aforementioned wireless transmission modules may be modules adopting transmission standards such as Bluetooth or infrared, which is not limited thereto.

As described above, the input/output body 11 and the connection part 12 may be electrically connected by wire or wirelessly, and the variations or combinations of the connections are not limited by the embodiment of the invention. In the first embodiment, where the connected expansion device 10 and mobile device is operating in the working mode, the keyboard 111 of the input/output body 11 is facing upwards, so that the user may easily type on the keyboard 111 with fingers. However, in other embodiments, the surface disposed with the keyboard 111 may be disposed with a touch panel to achieve the same input functions.

Figure 4:
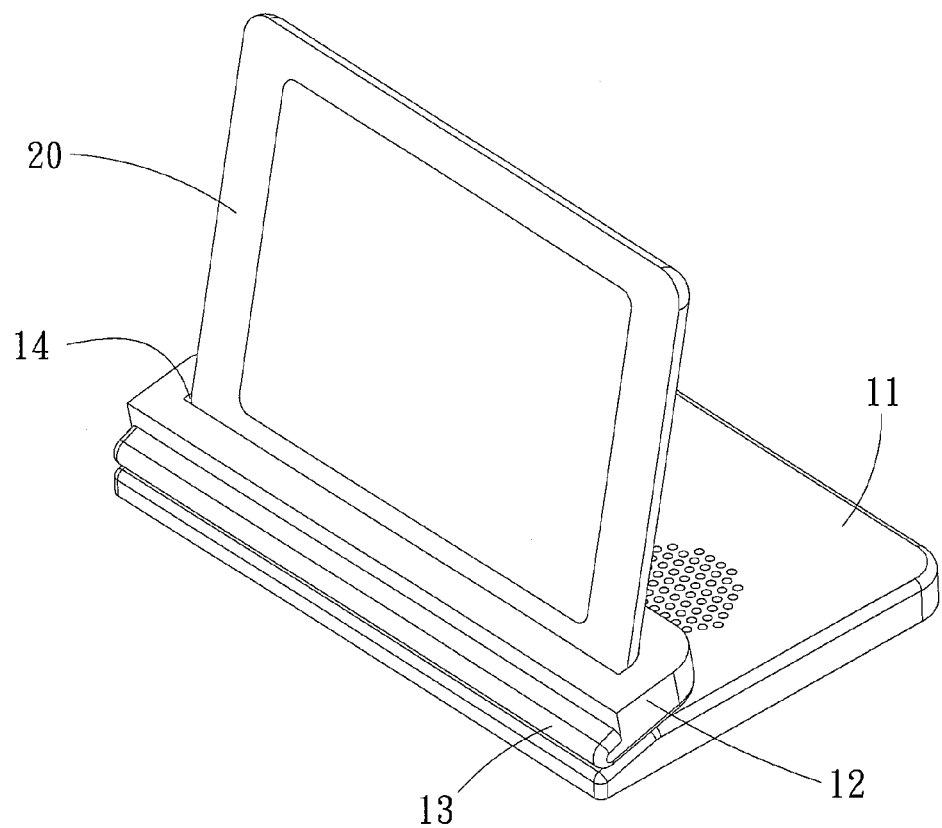
FIG. 4 is a schematic diagram illustrating that the expansion device, which is assembled with a mobile device, operates in the entertainment mode according to the first embodiment of the invention.
Figure 5:
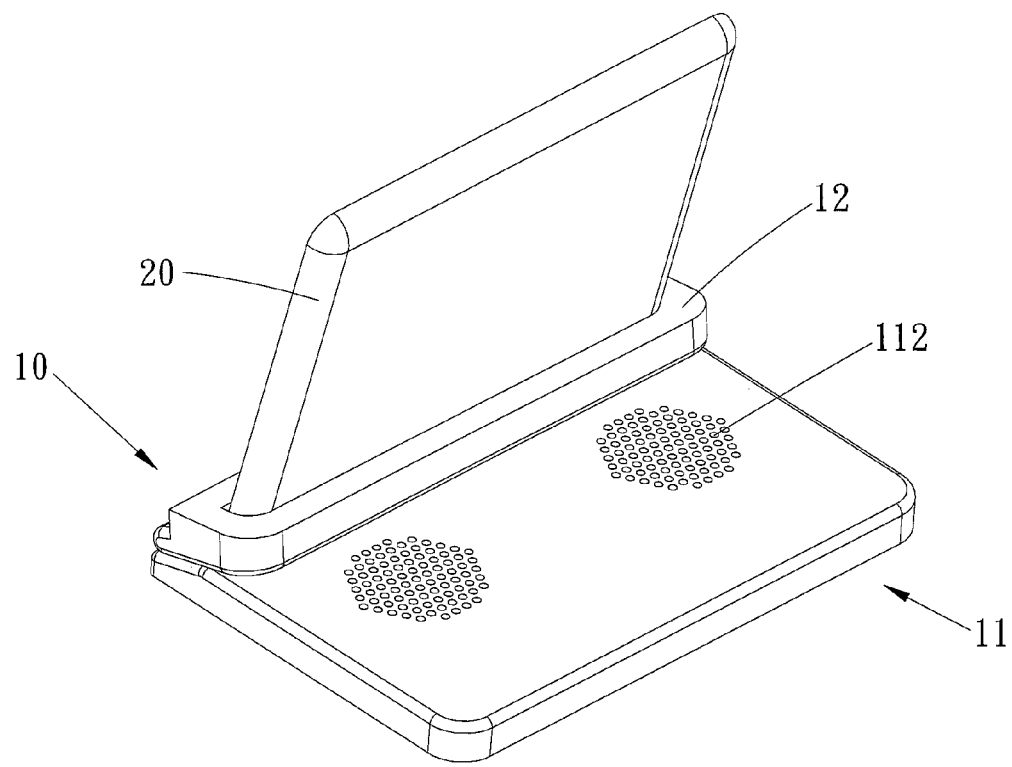
FIG. 5 is a schematic diagram illustrating another point of view of the expansion device, which is assembled with a mobile device, operates in the entertainment mode according to the first embodiment of the invention.

FIG. 4 is a schematic diagram illustrating that the expansion device, which is assembled with a mobile device, operates in the entertainment mode according to the first embodiment of the invention. FIG. 5 is a schematic diagram illustrating another point of view of the expansion device, which is assembled with a mobile device, operates in the entertainment mode according to the first embodiment of the invention.

Since the expansion device 10 has the turning structure 13 in the first embodiment, the user may easily adjust the angle between the mobile device 20 and the expansion device 10, such that the user may adjust the desired angle of view while watching the mobile device 20. Referring to FIGS. 1B, and 4-5, for example, when the angle between the mobile device 20 and the keyboard 111 is 0 degree, the mobile device 20 is superposed over the keyboard 111. When the angle between the mobile device 20 and the keyboard 111 is 90 degrees, the keyboard 111 is facing upwards and is suitable for operating in the working mode with the mobile device 20. When the angle between the mobile device 20 and the keyboard 111 is 180 degrees, the mobile device 20 and the keyboard 111 are coplanar or placed almost along a plane. When the angle between the mobile device 20 and the keyboard 111 is 270 degrees, the expansion device 10 may be turned upside-down, such that the speaker device 112 is facing upwards and is suitable for operating in the entertainment mode with the mobile device 20.

Besides, for most of the office workers, keyboards are indispensable parts of work. Therefore, when the office workers see the keyboards, they might subconsciously associate the keyboards with their work, which virtually results in mental pressure. With the downward design of the keyboard in the embodiments of the invention, the user may enjoy great sound effects brought by the speaker device 112 of the expansion device 10, while avoiding mental pressure by not seeing the keyboard 111. On the other hand, in the entertainment mode, the mobile device 20 can be erected by being held by the slot 14, such that the user does not need to hold the mobile device 20 while watching or operating the mobile device 20. Moreover, the screen of the mobile device 20 may be projected by a projector disposed in the expansion device 10, or the expansion device 10 may be further disposed with batteries to provide powers for performing entertainments and enhancing performances.

FIGS. 6A-6D would be referred to describe some turning characteristics of the connected expansion device 10 and mobile device 20, in which the connection is implemented by connecting the slot 14 with the connection part 12.

Figure 6A:
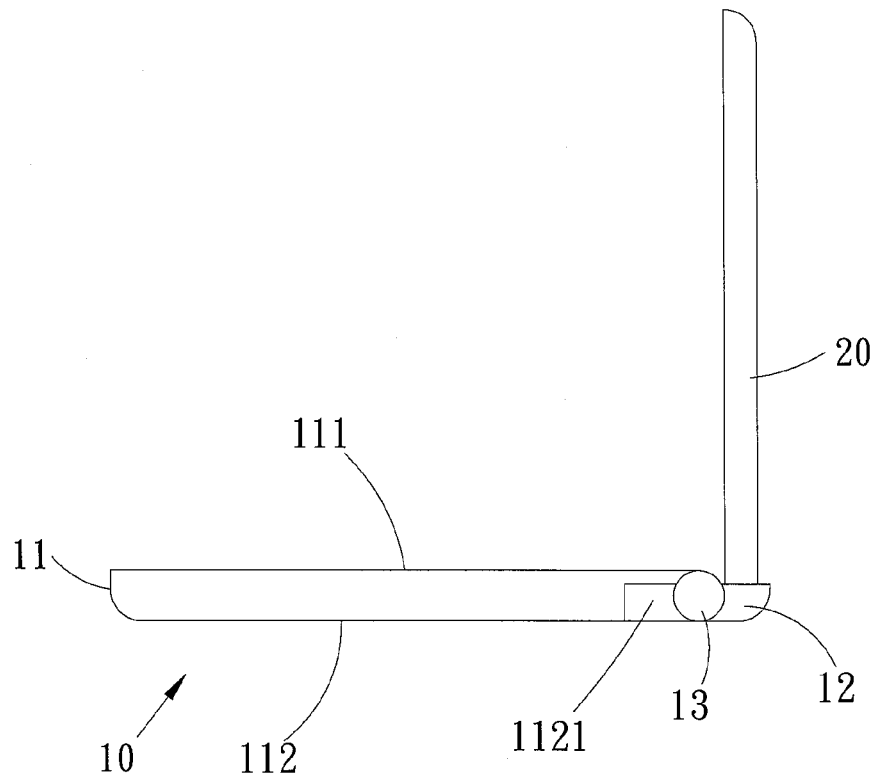
FIG. 6A is a schematic diagram illustrating a side view in which the expansion device operates in the working mode according to the first embodiment of the invention.
Figure 6B:
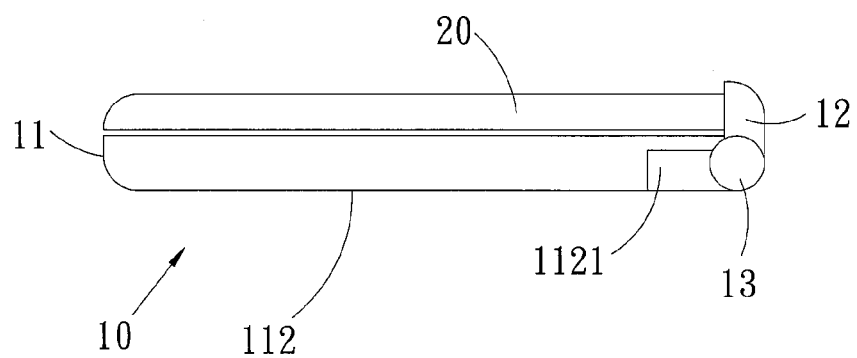
FIG. 6B is a schematic diagram illustrating a side view in which the expansion device does not operate in the working mode according to the first embodiment of the invention.
Figure 6C:
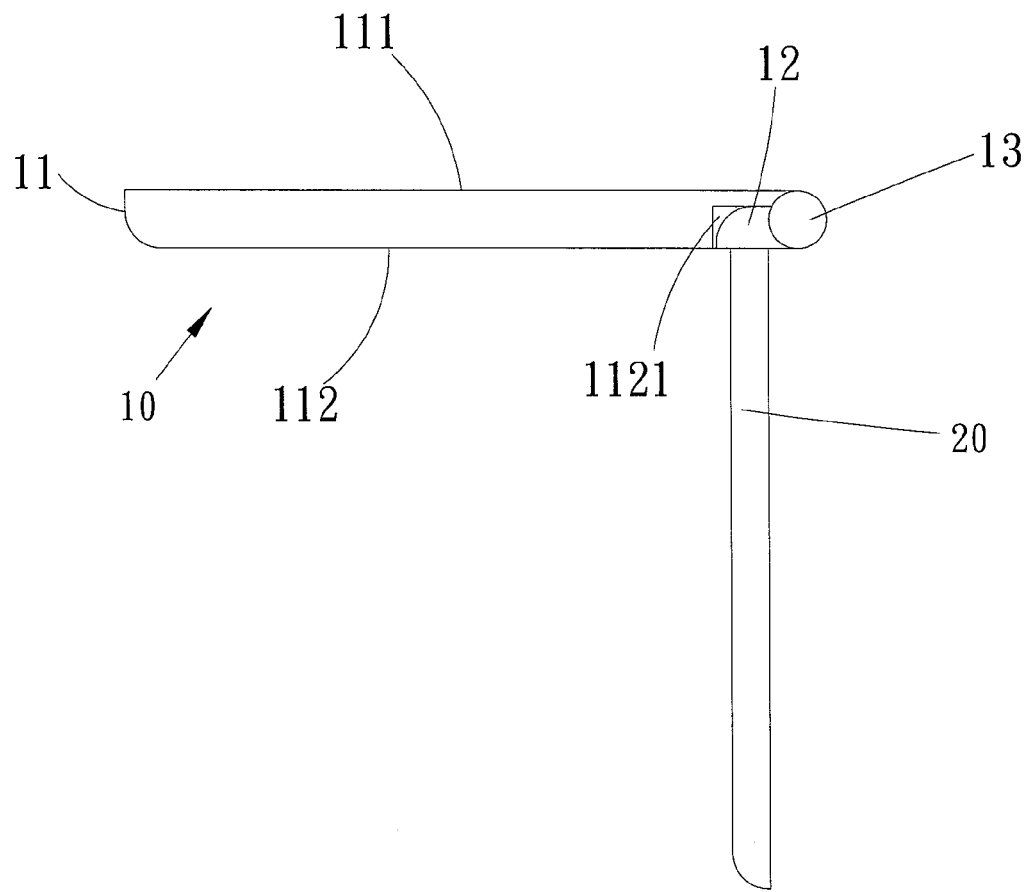
FIG. 6C is a schematic diagram illustrating a side view in which the expansion device is switched to the entertainment mode according to the first embodiment of the invention.
Figure 6D:
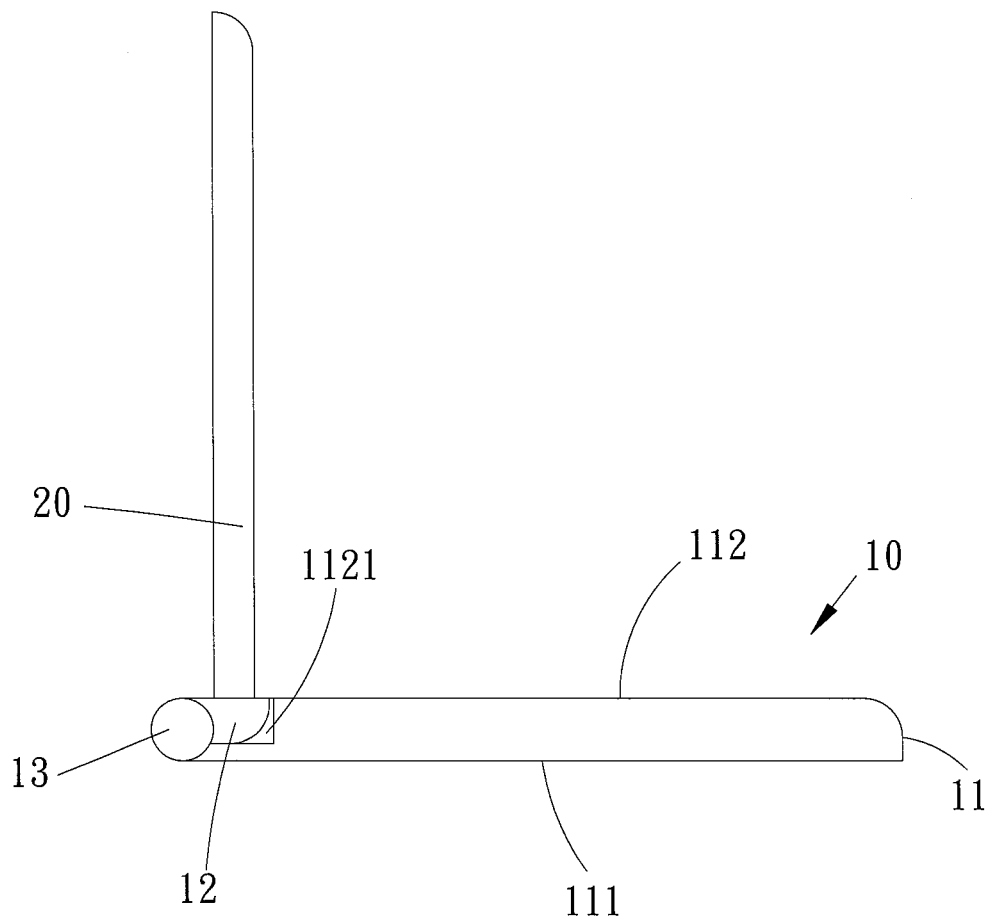
FIG. 6D is a schematic diagram illustrating a side view in which the expansion device operates in the entertainment mode according to the first embodiment of the invention.

FIG. 6A is a schematic diagram illustrating a side view in which the expansion device operates in the working mode according to the first embodiment of the invention. FIG. 6B is a schematic diagram illustrating a side view in which the expansion device does not operate in the working mode according to the first embodiment of the invention. FIG. 6C is a schematic diagram illustrating a side view in which the expansion device is switched to the entertainment mode according to the first embodiment of the invention. FIG. 6D is a schematic diagram illustrating a side view in which the expansion device operates in the entertainment mode according to the first embodiment of the invention.

As shown in FIGS. 6A-6D, the input/output body 11 and the connection part 12 are connected via the turning structure 13 and turnable on the turning structure 13. Besides, a recess 1121 is further disposed near the connection part 12, which is on the side where the speaker device 112 being disposed. The place where the recess 1121 being disposed is just an example. In other embodiments, the recess 1121 may be disposed at one side of the keyboard 111 or other places near the connection part 12 according to various implementation.

As shown in FIG. 6A, the 90-degree angle between the mobile device 20 and the keyboard 111 of the input/output body 11 is just an example, the user may perform any desired adjustment to the angle.

As shown in FIG. 6B, the mobile device 20 is superposed over the keyboard 111. When the rear of the mobile device 20 is facing upwards and the front side of the mobile device 20 faces the keyboard 111, the screen of the mobile device 20 would not be exposed anymore, such that the expansion device 10 has the functionality of protecting the screen of the mobile device 20 from being scratched. In addition, since the mobile device 20 and the expansion device 10 are not in the working mode (because they are closed), the user may carry the mobile device 20 superposed over the expansion device 10 in a more convenient way.

Referring to both FIGS. 6A and 6C, the 90-degree angle between the mobile device 20 and the expansion device 10 in FIG. 6A can be adjusted into the configuration illustrated in FIG. 6C by turning the turning structure 13 by 180 degrees. Referring to both FIGS. 6B and 6C, the 0-degree angle between the mobile device 20 and the expansion device 10 in FIG. 6B can be adjusted into the configuration illustrated in FIG. 6C by turning the turning structure 13 by 270 degrees.

The connection part 12 may be configured to be held by the recess 1121. In FIG. 6C, the end surface of the recess 1121 is parallel to the surface where the speaker device 112 locates. The end surface of the connection part 12 is also parallel to the input/output body 11 and just reaching the end surface of the recess 1121, such that the angle between the mobile device 20 and the expansion device 10 becomes 90 degrees, reaching the maximum degree that the mobile device 20 and the connection part 12 can be turned.

In this embodiment, the turning structure 13 can be rotated, for example, by at least 270 degrees. However, the angle by which the mobile device 20 can be turned can be correspondingly adjusted according to various structures of the connection part 12 and the recess 1121. In other embodiments, the angle by which the mobile device 20 can be turned can be further enlarged to achieve a larger angle according to the demands of users.

Furthermore, the mobile device 20 in FIG. 6C may be turned upside-down to be the configuration as shown in FIG. 6D, such that the user may simultaneously watch the mobile device 20 and enjoy the music played by the speaker device 112, while avoiding the mental pressure resulted from seeing the keyboard 111.

In other embodiments, the expansion device proposed in the present invention can be further configured to be a double-slot design.

Figure 7A:
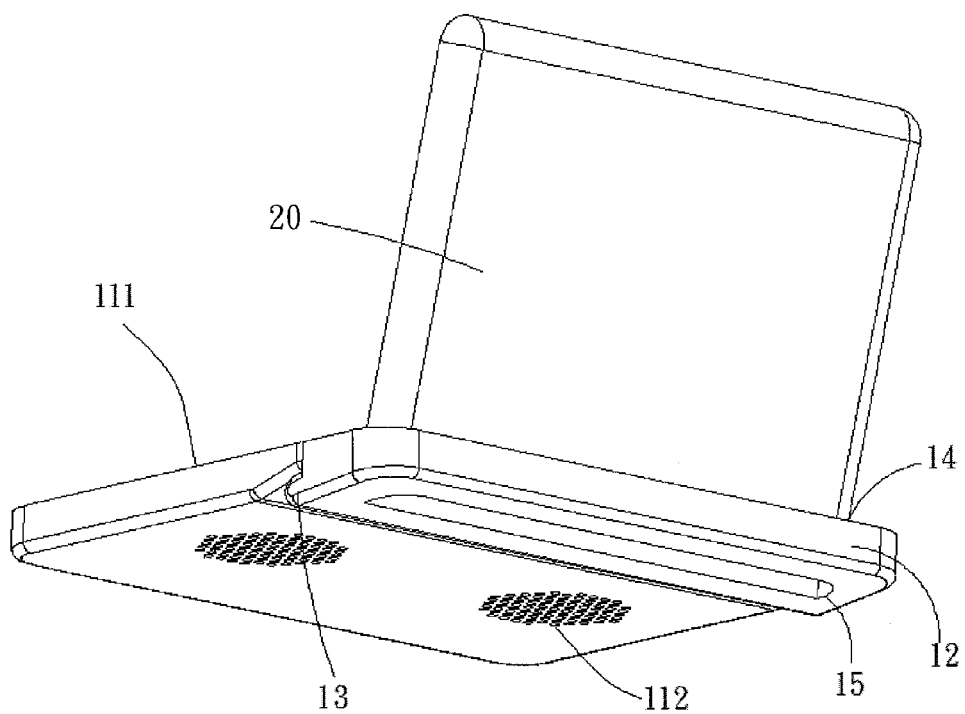
FIG. 7A is a schematic diagram illustrating that the expansion device operates in the working mode according to a second embodiment of the invention.
Figure 7B:
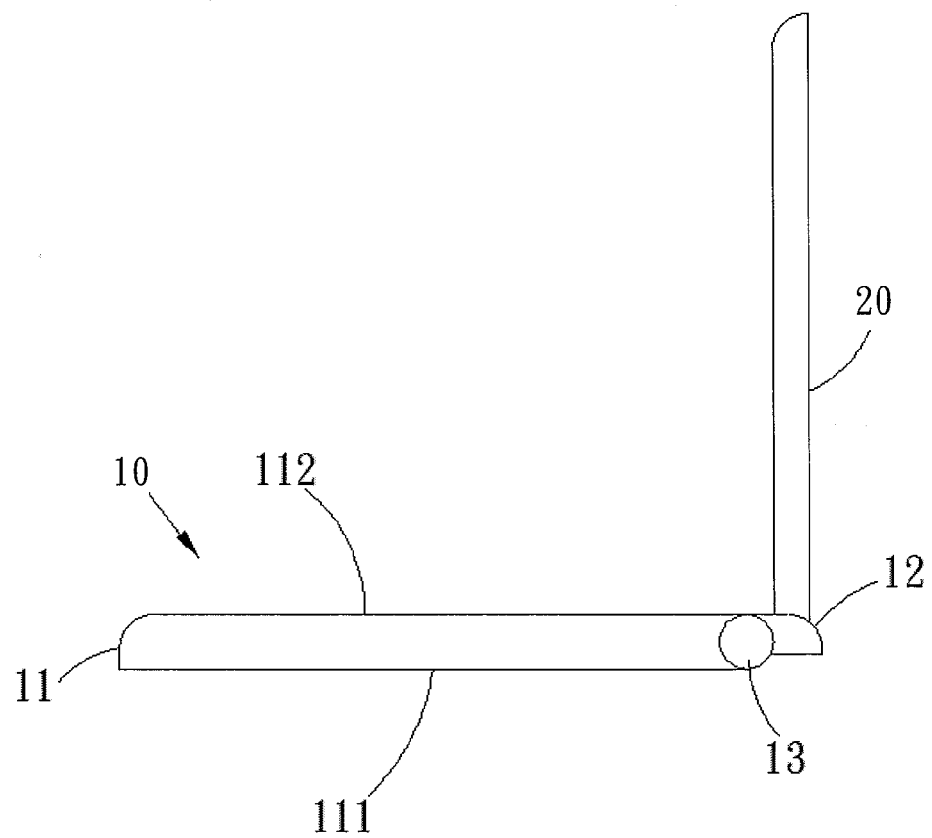
FIG. 7B is a schematic diagram illustrating that the expansion device operates in the entertainment mode according to the second embodiment of the invention.

FIG. 7A is a schematic diagram illustrating that the expansion device operates in the working mode according to a second embodiment of the invention. FIG. 7B is a schematic diagram illustrating that the expansion device operates in the entertainment mode according to the second embodiment of the invention. In the embodiments illustrated in FIGS. 7A and 7B, the expansion device 10 further includes a slot 15, which makes the expansion device 10 become the double-slot design. The slot 15 may be disposed on an opposite surface of the connection part 12. That is, the slot 15 may be disposed on the same surface where the speaker device 112 is disposed.

As shown in FIG. 7A, the expansion device 10 is in the working mode. When the user wants to change from the working mode to the entertainment mode, the user may simply put the mobile device 20 into the slot 15 and turns the surface of the speaker device 112 to face upwards, as shown in FIG. 7B. In the configurations illustrated in FIGS. 7A and 7B, the user may optionally adjust the angle between the mobile device 20 and the expansion device 10 to any desired angle. Besides, when the mobile device 20 is placed in the slot 14, the mobile device 20 may be superposed over the keyboard 111 by turning the turning structure 13. Or, when the mobile device 20 is placed in the slot 15, the mobile device 20 may be superposed over the speaker device 112 by turning the turning structure 13 by 180 degrees. Compared with the turning structure with one slot of the first embodiment, the turning structure with double-slot design of the second embodiment is more suitable for being used as the turning structure which cannot be rotated by more than 180 degrees. Therefore, the motion of the expansion device in the second embodiment would not be limited by the turning angle of the turning structure. Besides, the double-slot design enables the user to arbitrarily change the status of working mode or entertainment mode, however, the possible implementation of the present invention is not limited thereto. In other embodiments, the user may arbitrarily adjust the angle between the mobile device 20 and the expansion device 10, or place any kind of mobile device 20 into the slot 15.

In summary, the embodiments of the present invention provide an expansion device. When a mobile device is connected with the expansion device, they may be able to provide the working mode (in which the keyboard may be used) and the entertainment mode (which may enable the user enjoy the music while watching the mobile device). Moreover, when the mobile device is temporarily not in use, the screen can be protected by superposing the mobile device over the input/output body, which further provides an advantage that the mobile device can be easily carried.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An expansion device suitable for expanding capabilities of a mobile device, comprising:
   at least one mobile device;
   an input/output body, having a first input/output module and a second input/output module disposed respectively on two opposite surfaces of the input/output body;
   a connection part, disposed on one side of the input/output body;
   a turning structure, disposed to connect the input/output body and the connection part, wherein the connection part and the input/output body are turnable on the turning structure; and
   at least one slot, disposed on the connection part and configured to hold the at least one mobile device,
   wherein a recess is disposed onto the side of the input/output body on which the connection part is disposed, the connection part is capable of being turned into the recess, and the connection part is capable of being turned to enable an end surface of the connection part reaches a position against an end surface of the recess, and
   wherein the at least one mobile device, after being held by the slot and turned no more than 180 degrees, is perpendicular to the input/output body.

2. The expansion device as claimed in claim 1, wherein the connection part holding the mobile device is capable of being turned towards the first input/output module so as to superpose the mobile device over the expansion device.

3. The expansion device as claimed in claim 1, wherein the first input/output module or the second input/output module is capable of being turned to face upwards to be used.

4. The expansion device as claimed in claim 1, wherein one of the at least one slot is disposed on a surface of the connection part.

5. The expansion device as claimed in claim 4, wherein another of the at least one slot is disposed on an opposite surface of the connection part.

6. The expansion device as claimed in claim 1, wherein the mobile device is capable of being electrically connected to the expansion device by wire.

7. The expansion device as claimed in claim 6, wherein the mobile device has at least one port, configured to connect to at least one terminal in the slot by wire, and the connection part is electrically connected to the input/output body.

8. The expansion device as claimed in claim 1, wherein the mobile device is capable of being electrically wirelessly connected to the expansion device.

9. The expansion device as claimed in claim 8, wherein the mobile device has a wireless transmission module, and the input/output body or the connection part has a corresponding wireless transmission module.

10. The expansion device as claimed in claim 9, wherein the first input/output module composes a keyboard or a touch panel.

11. The expansion device as claimed in claim 1, wherein the second input/output module composes a speaker or a projector.

* * * * *